United States Patent
Fratantoni (10) Patent No.: US 8,272,109 B2
(45) Date of Patent: Sep. 25, 2012

(54) DEVICE FOR RETAINING OBJECTS TO SURFACES

(76) Inventor: Sam Fratantoni, Scottsdale, AZ (US)

(*) Notice: Subject to any disclaimer, the term of this patent is extended or adjusted under 35 U.S.C. 154(b) by 208 days.

(21) Appl. No.: 12/732,737

(22) Filed: Mar. 26, 2010

(65) Prior Publication Data

US 2011/0232045 A1    Sep. 29, 2011

(51) Int. Cl.
*A44B 11/25* (2006.01)
*A44B 99/00* (2010.01)

(52) U.S. Cl. ............... 24/302; 24/3.1; 24/3.12; 24/3.13; 24/298; 24/304; 248/74.1; 248/74.3; 248/205.3; 248/205.4

(58) Field of Classification Search ............ 24/3.12, 24/3.13, 3.1, 302, 304, 298; 248/74.1, 74.3, 248/205.3, 205.4
See application file for complete search history.

(56) References Cited

U.S. PATENT DOCUMENTS

| | | | | |
|---|---|---|---|---|
| 337,311 A * | 3/1886 | Davis | | 473/38 |
| 1,859,893 A * | 5/1932 | Ritz-Woller | | 248/542 |
| 1,933,218 A | 10/1933 | Miller | | |
| 2,102,690 A * | 12/1937 | Fischer | | 211/87.01 |
| 2,122,208 A * | 6/1938 | Lyie | | 24/104 |
| 2,157,806 A * | 5/1939 | Tilton | | 40/200 |
| 2,679,373 A * | 5/1954 | Henley | | 248/262 |
| 3,140,069 A * | 7/1964 | Mcburney et al. | | 248/514 |
| 3,374,510 A * | 3/1968 | Freed | | 24/103 |
| 4,201,013 A | 5/1980 | Robbins | | |
| 4,576,664 A | 3/1986 | Delahunty | | |
| 4,650,141 A * | 3/1987 | Longo et al. | | 248/118 |
| 4,918,792 A * | 4/1990 | Engels | | 24/300 |
| 5,433,413 A * | 7/1995 | Adams | | 248/205.3 |
| 5,642,871 A * | 7/1997 | Repert et al. | | 248/686 |
| 5,979,019 A * | 11/1999 | Johnson | | 24/3.11 |
| 6,427,293 B1 * | 8/2002 | Bowes, Jr. | | 24/304 |
| 6,497,396 B1 | 12/2002 | Adams | | |
| 2003/0014843 A1 * | 1/2003 | deLorimier | | 24/3.1 |
| 2003/0014844 A1 * | 1/2003 | Splane, Jr. | | 24/3.1 |
| 2005/0151038 A1 * | 7/2005 | Packard et al. | | 248/205.3 |

FOREIGN PATENT DOCUMENTS

GB    2 255 488 A    11/1992

* cited by examiner

*Primary Examiner* — Robert J Sandy
*Assistant Examiner* — David Upchurch
(74) *Attorney, Agent, or Firm* — Thomas W. Galvani, P.C.; Thomas W. Galvani (57) ABSTRACT

A retaining device for retaining an object or objects to a surface or surfaces. The device includes an elongate, flexible strap having a plurality of bores and a retaining member embedded within a platform body. The retaining member has first and second portions. The first portion has a first end which is passed through one or more of the bores of the strap to operatively connect the strap to the retaining member. The strap is placed around the object to be retained. The second portion retains the first portion in a closed position so that the object is retained securely but non-permanently. An adhesive between the platform body and the surface permanently fixes the retaining device to the surface.

19 Claims, 7 Drawing Sheets

DEVICE FOR RETAINING OBJECTS TO SURFACES

CROSS-REFERENCE TO RELATED APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO A SEQUENCE LISTING

Not applicable.

BACKGROUND OF THE INVENTION

The invention relates generally to a retaining device, and more specifically to a retaining device for retaining one or more objects to a surface or surfaces.

U.S. Pat. No. 1,933,218 entitled Vine Guide issued to Miller discloses a device for training and supporting a plant against a wall, post, or trellis. The device consists of a solid base with a closed loop of wire extending from the base that can be molded. The wire is bent into position to hold the vine against the wall and will not lose the shape into which it is bent.

U.S. Pat. No. 4,201,013 entitled Vine Support and/or Guide for Installation on Brick Walls issued to Robbins discloses a device that clips on to an individual brick in a brick wall. The device is a wire bent in such a way that it has gripping arms at its two ends and a loop in its middle jutting from the wall into which a vine can be placed.

U. K. Patent No. GB 2,255,488 A entitled Support Apparatus for Plants issued to Betts discloses a plastic disk and a tie element with opposite ends that engage each other to create a loop around a vine. The device attaches to a wall with a screw and a masonry anchor, and the device is tightened down on a tie wire.

U.S. Pat. No. 4,576,664 entitled Fixing Article Holders to Surfaces issued to Delahunty discloses an adhesive which can be hardened inside a base socket of a strap that loops around a plant. The two ends of the strap are configured so that they engage each other to create the loop.

U.S. Pat. No. 6,497,396 entitled Fastening Device issued to Adams discloses a device for supporting objects against a brick or block wall. The device relies on a biasing or camming action to engage and adhere to the wall. The device also has a hook or loop from which an object can be mounted, hung, or supported.

BRIEF SUMMARY OF THE INVENTION

The invention is a retaining device for retaining one or more objects to a surface or surfaces. It is comprised of an elongate, flexible strap having a plurality of bores and a retaining member embedded within a platform body. The retaining member has first and second portions. The first portion has a first end which is passed through one or more of the bores of the strap to operatively connect the strap to the retaining member. The strap is placed around the object to be retained at least once. The second portion retains the first portion in a closed position so that the object is retained non-permanently and securely. An adhesive between the platform body and the surface permanently fixes the retaining device to the surface.

DETAILED DESCRIPTION OF THE INVENTION

Figure 1:
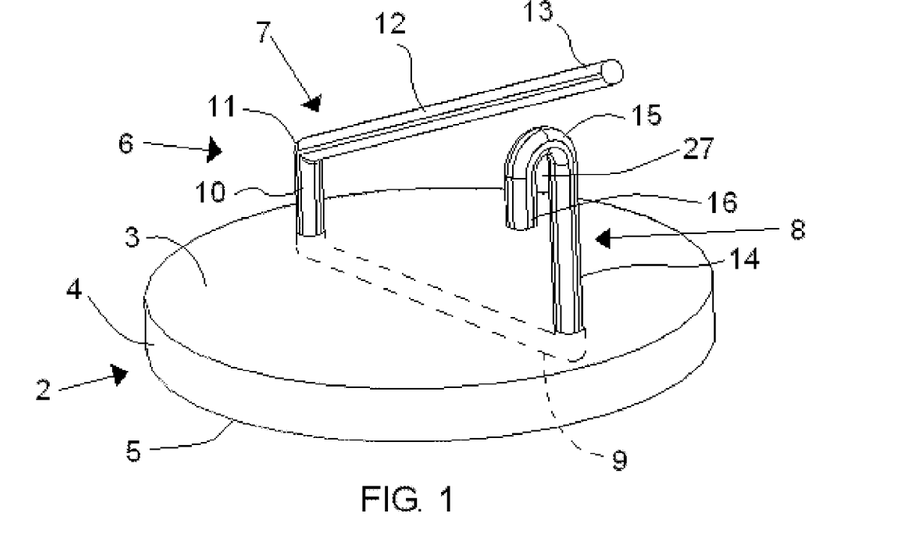
FIG. 1 is a perspective view of an embodiment of the invention.
Figure 2:
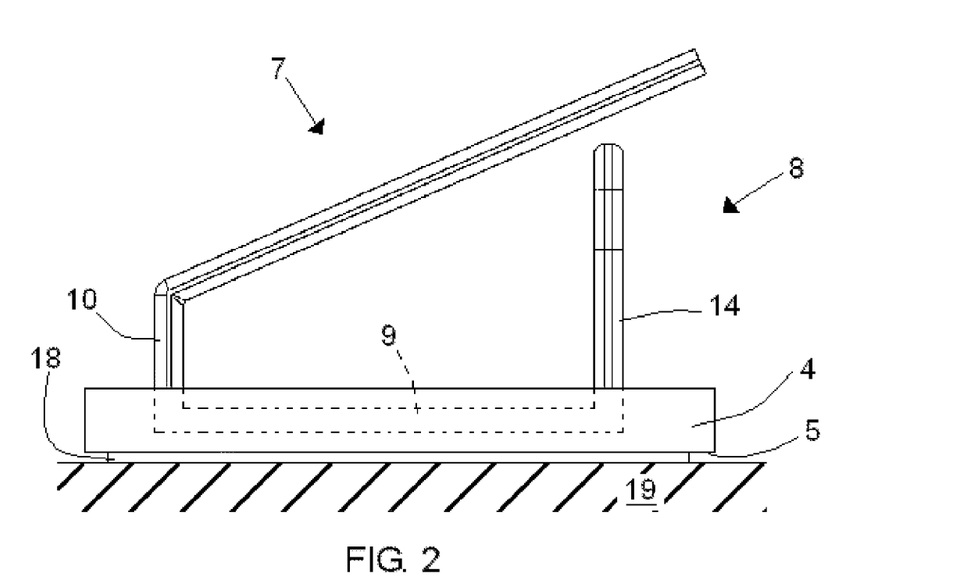
FIG. 2 is an elevation view of an embodiment of the invention showing a surface in cross-section.

FIG. 1 shows an embodiment of the invention. In this embodiment, a platform 2 has a cylindrical platform body 4, a first planar face 3, and an opposite second planar face 5. Embedded partially within the platform body 4 is a retaining member 6. A middle portion 9 of the retaining member 6 is embedded. The middle portion 9 is shown in FIG. 2. Connected to the middle portion 9 is a first portion 7 of the retaining member 6. The first portion 7 is composed of a first head 10, a first transition 11, a first body 12, and a first end 13. Also connected to the middle portion 9 is a second portion 8, which is composed of a second head 14, second transition 15, and a second end 16. The second head 14 protrudes from the platform body 4 substantially normal to the first planar face 3. In this embodiment, the first head 10 is shorter in length than the second head 14. The second transition 15 is U-shaped such that the second end 16 is aligned substantially normal to the first planar face 3. A retaining space 27 is defined on three sides by the second end 16, the second transition 15, and the second head 14. The retaining member 6 is made of a material, preferably metal, with a spring coefficient effecting a force tending to return the first portion 7 to an equilibrium position. In this embodiment, when the retaining member 6 is not acted upon by any force and is in an equilibrium position, the first transition 11 aligns the first body 12 at an obtuse angle to the first head 10 in a plane substantially normal to the first planar face 3. Further, in this embodiment, the retaining member 6 preferably has a circular cross-section, although the cross-section could be rectangular, oval, triangular, or some other shape.

FIG. 2 shows an embodiment of the invention in an elevation view. In this embodiment, the first head 10 is shorter in length than the second head 14. In other embodiments, the first head 10 may be longer than or equal in length to the second head 14. FIG. 2 shows how the middle portion 9 is attached to the first portion 7 and the second portion 8. An adhesive 18 connects the second planar face 5 to a surface 19. The adhesive 18 permanently fixes the second planar face 5 so that this embodiment cannot rotate or move independently of the surface 19. The surface 19 shown here is horizontal; however, the surface 19 may be vertical or diagonal, as in a wall, overhang, soffit, vaulted ceiling, or roof fascia. In this embodiment, the first portion 7 is in an equilibrium position where it is not stressed, no forces are acting on it, and the distance between the first portion 7 and second portion 8, at the point where the first portion 7 and second portion 8 are closest, is 0.3175 centimeters (one-eighth of an inch). Alternatively, in other embodiments, that distance can be less than 0.3175 centimeters (one-eighth of an inch).

Figure 3:
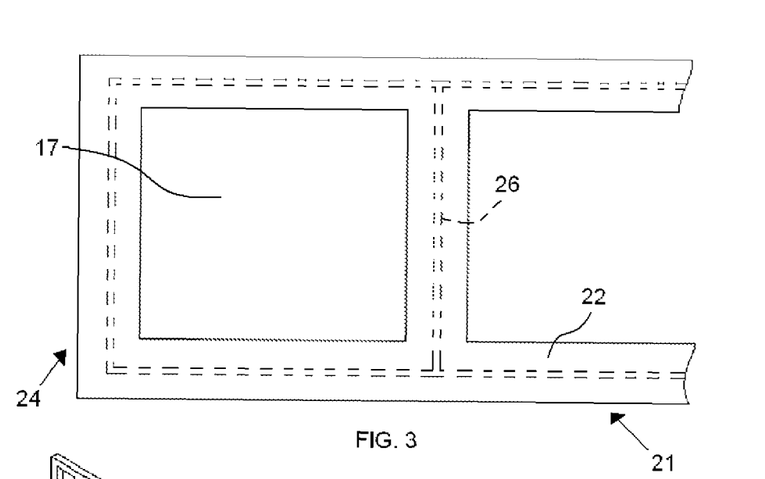
FIG. 3 is a plan view of a portion of the strap.

FIG. 3 shows a detailed view of an embodiment of a first strap end 24 of a strap 21. The strap 21 has a bore 17 through both a first strap face 22 and an opposite and identical second strap face 23 (not shown in FIG. 3). The strap 21 is preferably made of plastic but may be of some other material which is flexible and durable enough for exposure to elements (which may be, by way of example only, sun, wind, rain, heat, cold, ice, snow, children's tugging, pets, weight of the object 20 to be retained). The strap 21 may be made entirely of one material or it may preferably have an integral metal wire 26, as shown in FIG. 3, between the first strap face 22 and the second strap face 23. The strap 21 material withstands exposure to varying temperatures which may cause expansion and contraction of the material. In large-scale production, the strap 21 may be manufactured in a number of ways. The strap 21 may be extruded continuously and the bores 17 cut out with a die. Alternatively, the strap 21 may be cast from a pre-formed mold having voids for the bores 17. Alternatively, the strap 21 may be produced in a large array or sheet of straps 21 and then each individual strap 21 be cut piece by piece from the array or sheet. Alternatively, the integral metal wire 26 may be created first through extrusion or some other process and then dipped in heated plastic which is allowed to solidify on the integral metal wire 26. Color can be added to the strap 21. Where the strap 21 is plastic, color additives can be integral to the plastic. Alternatively, the plastic is painted. Alternatively, where the strap 21 is metal, the metal is be painted, anodized, or treated with color in some other way.

Figures 4, 5, 6:
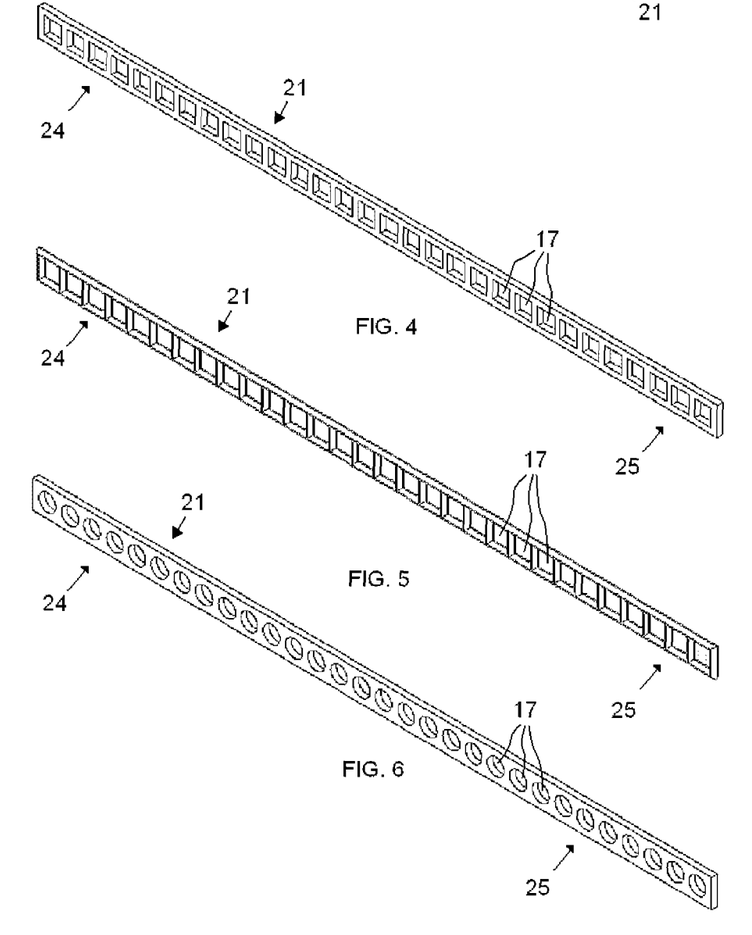
FIG. 4 is a perspective view of an embodiment of the strap.
FIG. 5 is a perspective view of an embodiment of the strap.
FIG. 6 is a perspective view of an embodiment of the strap.

FIGS. 4, 5, and 6 show perspective views of three embodiments of the elongate, flexible strap 21 with a plurality of bores 17. In FIG. 4, the strap 21 has a plurality of rectangular bores 17. First strap end 24 and second strap end 25 are opposite and identical, the strap 21 having several planes of symmetry. This symmetry allows for greater variability in use; the first strap end 24 can be substituted for the second strap end 25 without concern by the user. In FIG. 5, the strap 21 has a plurality of rectangular bores 17 and first strap face 22 and second strap face 23 have been beveled. In FIG. 6, the strap 21 has a plurality of circular bores 17. The strap 21 shown in FIG. 6 has thirty bores 17; however, the strap 21 may have a greater or fewer number of bores 17 depending on the needs of the user and the application. Each bore 17 is of sufficient size such that the first end 13 can be passed through any bore 17 in order to operatively connect the strap 21 to the first portion 7. The width of the bores 17 is between one-fourth and three-fourths the width of the strap 21 across the first strap face 22.

Figure 7:
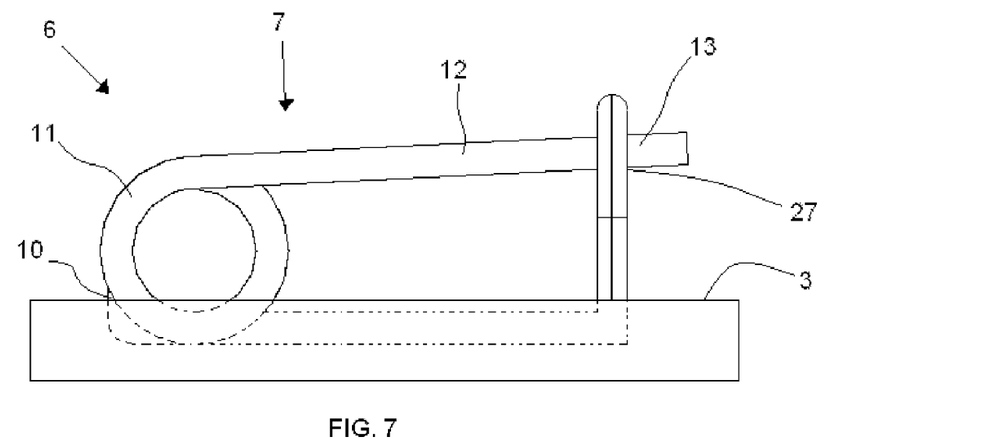
FIG. 7 is an elevation view of an embodiment of the invention.

FIG. 7 shows an elevation view of an embodiment of the invention in a closed position. A closed position is one in which the first end 13 is within the retaining space 27. An open position is one in which the first end 13 is not within the retaining space 27. The invention can be repeatedly positioned in either an open position or a closed position because the first end 13 is held within the retaining space 27 non-permanently. Additionally, the stiffness, elasticity, and resiliency of the material from which the retaining member 6 is made forces the first portion 7 to return to an equilibrium position without deformation despite repeated openings and closings. In the embodiment of FIG. 7, the first head 10 protrudes from the first planar face 3 and connects to the first transition 11. In this embodiment the first transition 11 is a circular bend or coil of the material that forms the retaining member 6. The first transition 11 effects a spring force on the first body 12 directed away from the first planar face 3.

Figure 8:
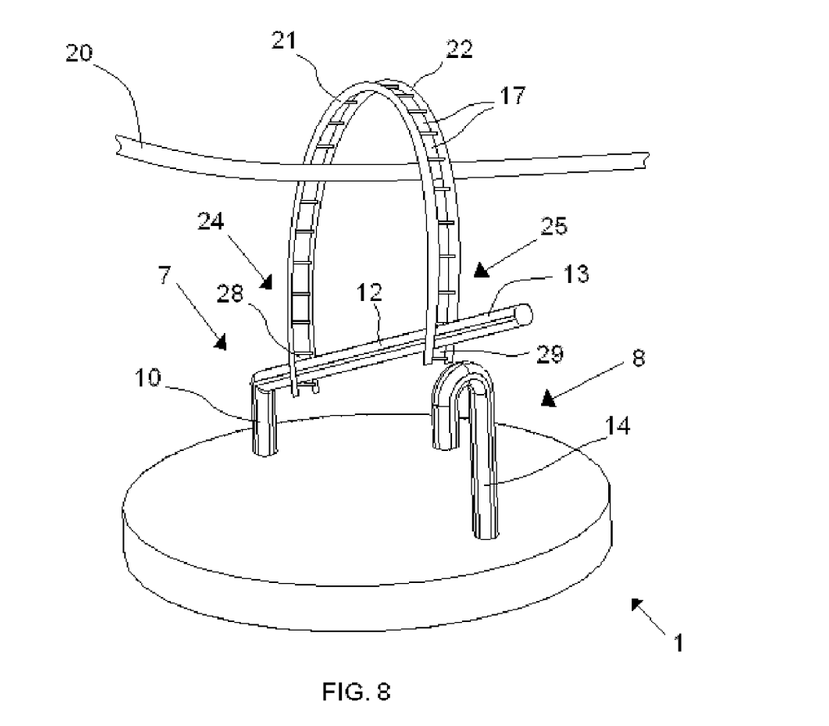
FIG. 8 is a perspective view of an embodiment of the invention with an object.

FIG. 8 shows an embodiment of the invention in an open position with the strap 21 placed around an object 20. In this embodiment, the first head 10 is shorter in length than the second head 14. The first end 13 has been passed through a first bore 28 proximal the first strap end 24, and the strap 21 has been placed around the object 20 once. The first end 13 has been passed through a second bore 29 proximal the second strap end 25.

The user can selectively pass the first end 13 through any of the bores 17 to non-permanently retain the object 20 more tightly or loosely. By passing the first end 13 through two bores 17 which are reasonably close to each other, the object 20 can be retained closely. Alternatively, passing the first end 13 though two bores 17 that are not close to each other, as shown in FIG. 8, the object 20 can be loosely retained. The decision regarding how tightly or loosely to retain the object 20 is left to the user based on a number of factors, such as the type of object 20 to be retained, (which may be, by way of example only, a plant, cord or cables, string of lights, pole, rope, drape), the conditions under which the object 20 is to be retained, exposure to elements and forces (which may be, by way of example only, sun, wind, rain, heat, cold, ice, snow, children's tugging, pets, weight of the object 20 to be retained), and the length of time the user desires to retain the object 20. Because the object 20 is non-permanently retained, if the user decides to loosen or tighten the strap 21 at a later time, the user can remove the strap 21 and re-attach the strap 21 as needed without damaging the strap 21 or the retaining device 1. The shape and size of the bores 17 in relation to the size of the strap 21 and the tightness of the strap 21 allows the strap 21 to move, rotate, expand, contract, or flex on or around the first portion 7 without detaching from the first portion 7 when the strap 21 is exposed to elements and forces. Furthermore, the strap 21 can break or tear between bores 17 and remain operatively connected to the first portion 7.

In the embodiment pictured in FIG. 8, the first portion 7 is in an equilibrium position, and the distance between the first portion 7 and the second portion 8, at a point where the first portion 7 and second portion 8 are closest, is substantially equal to half the width of the first strap face 22 less half the width of a bore 17. When the first portion 7 maintains this distance in an equilibrium position, the strap 21 can be passed onto the first portion 7, and the strap 21 will not come off the first portion 7 without application of force against the strap 21. Alternatively, in other embodiments, that distance is smaller than half the width of the first strap face 22 less half the width of a bore 17, to reduce the likelihood that the strap 21 will come off the first portion 7. Alternatively, in other embodiments, to further reduce the likelihood that the strap 21 will come off, a notch or bend can be placed or formed in the first body 12.

Figure 9:
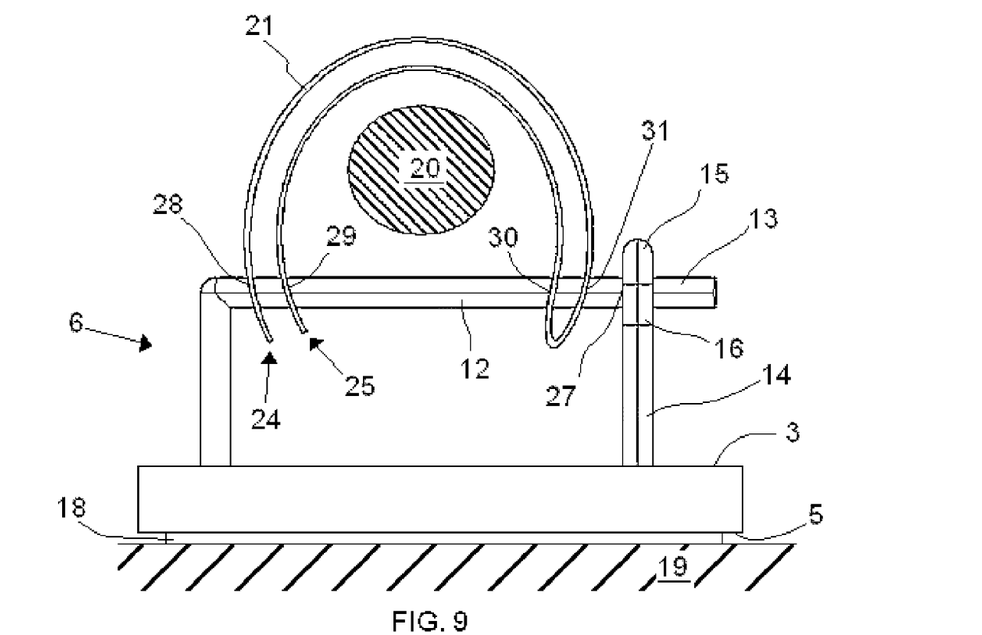
FIG. 9 is an elevation view of an embodiment of the invention with an object shown in cross-section.

FIG. 9 shows an embodiment of the invention fixed to a surface 19 in a closed position with an object 20 that has been retained shown in cross-section. This embodiment has been permanently fixed to the surface 19 by the application of an adhesive 18 between the second planar face 5 and the surface 19. In this embodiment, the strap 21 has been double-backed and placed onto the retaining member 6 around the object 20. This is done by folding the strap 21 in half and passing the first end 13 through a first bore 28 proximal to the first strap end 24 and through a second bore 29 proximal to the second strap end 25. The strap 21 is placed around the object 20, and the first end 13 is passed through a third bore 30 between the first strap end 24 and second strap end 25. The first end 13 is then passed through a fourth bore 31 between the first strap end 24 and the second strap end 25. To secure the retention of the object 20, the first body 12 is then depressed toward the first planar face 3 such that the first end 13 can be passed into the retaining space 27. To do this, the first end 13 must be depressed so that it clears the second end 16. The first end 13 is then pressed toward the second head 14 and is released into the retaining space 27. The stiffness, elasticity, and resiliency of the material of the retaining member 6 creates a force tending to return the first body 12 and first end 13 to an equilibrium position beyond the retaining space 27. However, because the second transition 15 is between the retaining space 27 and that equilibrium position, the first end 13 is held non-permanently in the retaining space 27. The object 20 can be released by removal of the strap 21 from the retaining member 6 without destroying the strap 21. This is done by depressing the first end 13 toward the first planar face 3 such that the first end 13 clears the second end 16. The first end 13 can then be moved away from the second head 14 and released. The first body 12 and first end 13 will then return to an equilibrium position. The strap 21 and object 20 can then be removed from the retaining member 6 with steps substantially opposite those for attaching the strap 21 and object 20 to the retaining member 6.

The strap 21 shown in FIG. 9 is double-backed by folding the strap 21 in half. The strap 21 can also be triple-backed by folding the strap 21 in thirds. This technique can be extrapolated with subsequent folding of the strap 21 as many times as the material and length of the strap 21 will reasonably allow. The decision regarding whether or how many times to fold the strap 21 is left to the user based on a number of factors similar to those the user considers in deciding how tightly or loosely to retain the object 20. In an example, if the user is retaining a tall plant next to a wall, the user may choose to retain the plant both tightly and with a double-backed strap 21 to reduce the distance the plant can sway and the likelihood that a strong wind will topple the plant.

Figure 10:
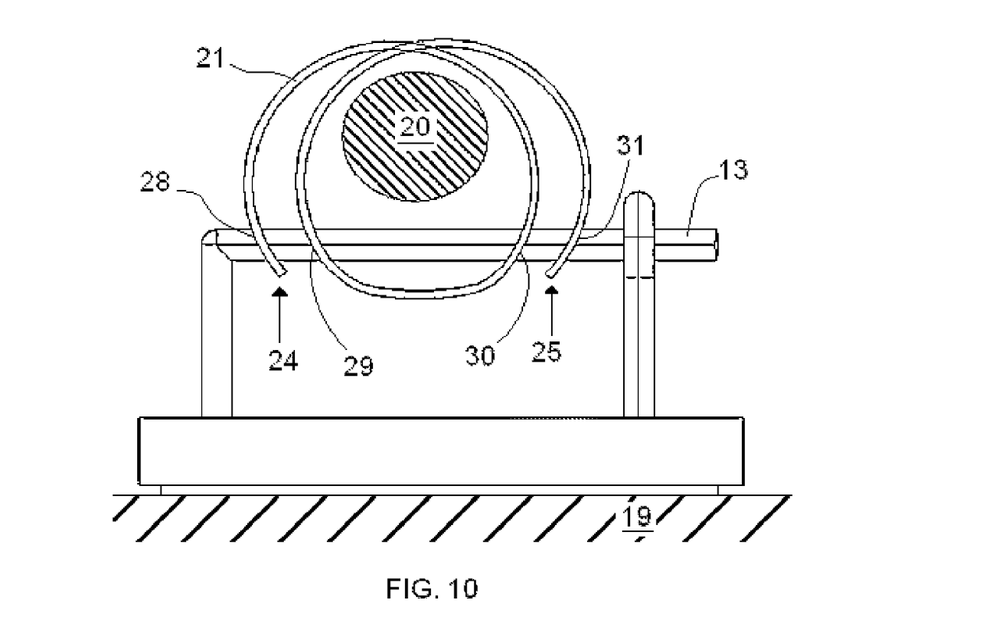
FIG. 10 is an elevation view of an embodiment of the invention with an object shown in cross-section.

FIG. 10 shows an embodiment of the invention fixed to a surface 19 in a closed position with an object 20 that has been retained show in cross-section. In this embodiment, the strap 21 has been arranged so that it creates a double loop for retaining the object 20. This can be done by passing the first end 13 through a first bore 28 proximal to the first strap end 24, passing the first end 13 through a second bore 29 between the first strap end 24 and second strap end 25, passing the first end 13 through a third bore 30 between the first strap end 24 and second strap end 25, and passing the first end 13 through a fourth bore 31 proximal to the second strap end 25.

Figure 11:
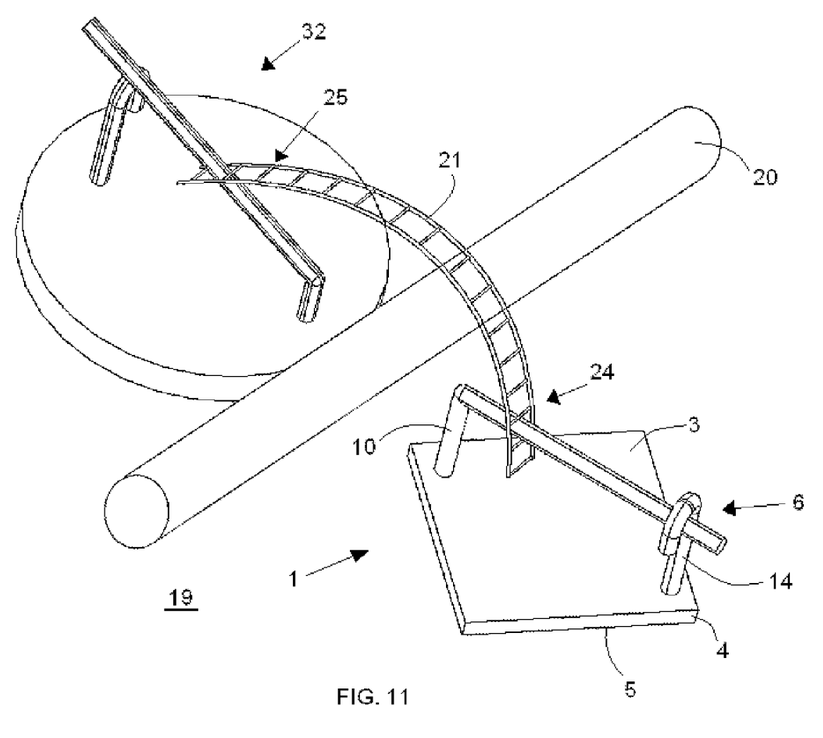
FIG. 11 is a perspective view of an embodiment of the invention with an object.

FIG. 11 shows an embodiment of the invention in use with a second retaining device 32. In this embodiment, the first planar face 3 is rectangular, the second planar face 5 is rectangular, and the platform body 4 is a rectangular prism. The first head 10 is the same length as the second head 14. The retaining device 1 is in a closed position and the strap 21 is operatively connected to the retaining member 6 proximal to the first strap end 24. The second strap end 25 is operatively connected to a second retaining device 32 in an open position. An object 20 is retained between the retaining device 1, second retaining device 32, and strap 21. This embodiment may be used when the object 20 is used in a situation in which a single retaining device 1 would not be strong enough. This embodiment could also be used where the object 20 is situated over a gap in a surface 19 or between two surfaces 19 and a single retaining device 1 cannot bridge the gap.

Figure 12:
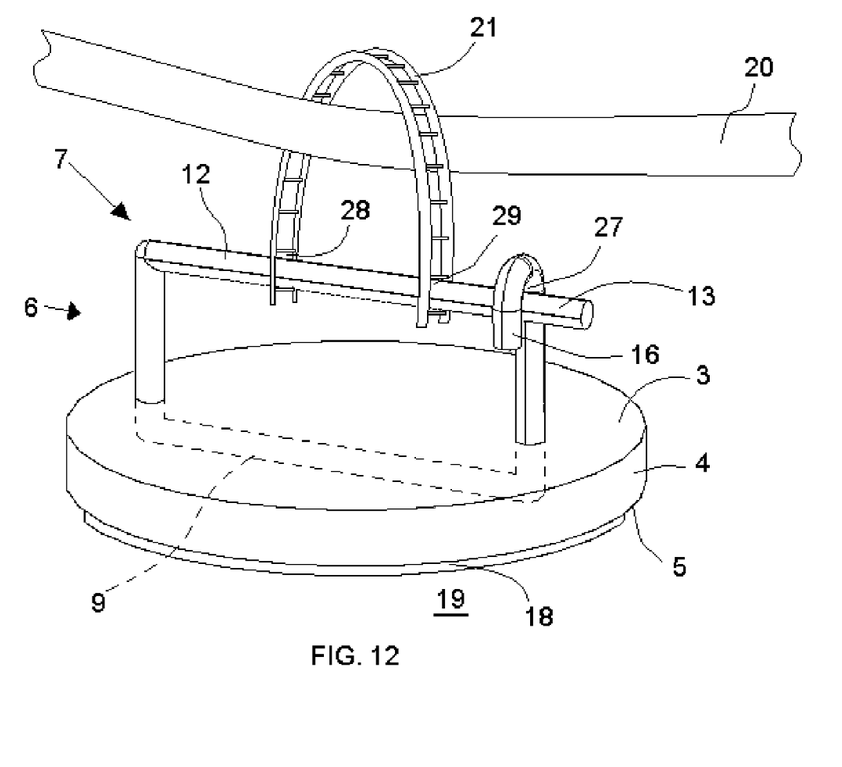
FIG. 12 is a perspective view of an embodiment of the invention with an object.

FIG. 12 shows an embodiment of the invention in the closed position with an object 20 retained. In this embodiment, the first planar face 3 and second planar face 5 are circular and the platform body 4 is cylindrical. The middle portion 9 of the retaining member 6 is embedded within the platform body 4. This embodiment is permanently fixed to a surface 19 by the application of an adhesive 18 between the surface 19 and the second planar face 5. The strap 21 has been operatively connected to the first portion 7 by passing a first bore 28 onto the first end 13. The strap 21 has been placed around the object 20 once, and a second bore 29 has been passed onto the first end 13. The first body 12 has been depressed toward the first planar face 3 such that the first end 13 cleared the second end 16 and could be passed into the retaining space 27. The first body 12 has been released so that the first end 13 is non-permanently retained in the retaining space 27.

Figure 13:
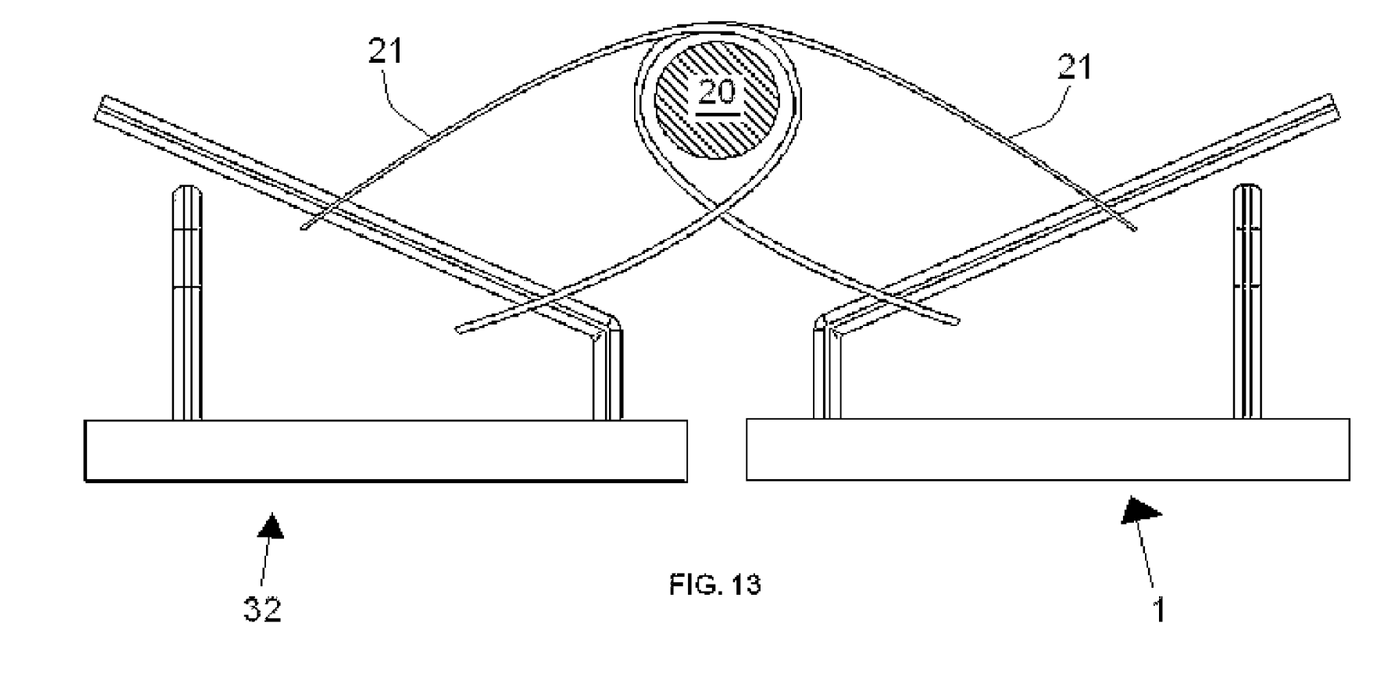
FIG. 13 is an elevation view of an embodiment of the invention with an object shown in cross-section.

FIG. 13 shows an embodiment of the invention in use with a second retaining device 32. In this embodiment, two straps 21 retain an object 20. One strap 21 is operatively connected to the retaining device 1, and the other strap 21 is operatively connected to the second retaining device 32.

In all embodiments, the retaining member 6 is made from a sufficiently stiff, elastic, and resilient material. The retaining member 6 may have a circular cross-section, although the cross-section could be rectangular, oval, triangular, or some other shape. In one method of manufacture, the retaining member 6 is extruded, cut to size, and bent. In another method of manufacture, the retaining member 6 is cast from liquid metal poured into a mold. The platform 2 is preferably plastic, but it can be metal, a masonry composition, or a ceramic. In an embodiment where the platform 2 is plastic, the platform 2 may be created by extrusion. Alternatively, the platform 2 may be cast in a mold. In an embodiment where the platform 2 is plastic, the retaining member 6 may be embedded within the platform body 4 by heating the retaining member 6 to a temperature sufficient to allow it to pierce the platform body 4 and then cooling the retaining member 6 and platform 2 so that the retaining member 6 is permanently embedded within the platform body 4. Alternatively, if the platform 2 is created from a mold, the retaining member 6 can be placed within the mold before pouring such that the platform 2 is created with the retaining member 6 embedded within the platform body 4.

In another embodiment of the invention not shown in a figure, the invention is in a package. Such a package includes a plurality of retaining members 6 embedded in platforms 2, a plurality of straps 21, instructions for the user to operatively connect the strap 21 to the retaining member 6 to retain an object 20, and an adhesive 18 contained in a tube, can, or some other container. Such a package allows and teaches a user to permanently fix the invention and retain an object 20 or multiple objects 20 to one or several surfaces 19.

The description of the embodiments is not intended to limit the invention to the exact construction and operation described, nor can it, with the limitations of language, describe all possible variations of the invention. Instead, the description describes the invention, discloses the manner and process of making and using the invention, enables any person skilled in the art to which the invention pertains to make and use the claimed invention, and sets forth the best mode contemplated by the inventor of carrying out the invention. It will be appreciated that numerous changes may be made to the invention without departing from the scope of the claims.

I claim:
1. A retaining device for retaining an object comprising:
   a. a strap having opposite and identical first strap face and second strap face and having opposite and identical first strap end and second strap end;
   b. the strap being flexible and elongate;
   c. a platform having opposite first planar face and second planar face and a platform body between the first and second planar faces;
   d. a retaining member having a first portion, a second portion, and a middle portion connecting the first portion and the second portion;
   e. the middle portion of the retaining member being embedded within the platform body;
   f. the first portion having a first head protruding from the platform body substantially normal to the first planar face;
   g. the first portion having a first transition connected to the first head;
   h. the first portion having a first body connected to the first transition;
   i. the first portion having a first end connected to the first body;
   j. the second portion having a second head protruding from the platform body substantially normal to the first planar face;
   k. the second portion having a second transition connected to the second head;
   l. the second portion having a second end connected to the second transition;
   m. the strap having a plurality of bores of sufficient size such that the first end can be passed through any bore;
   n. the strap being operatively connected to the first portion by passing the first end through at least one of the bores;
   o. the retaining member being of a sufficiently stiff, elastic, and resilient material such that, when the first portion is not stressed, the first end of the first portion of the retaining member is a distance away from the second portion, wherein the distance is substantially equal to half the width of the first strap face less half the width of a bore; and
   p. an adhesive permanently fixing the second planar face to a surface.
2. The retaining device of claim 1, wherein the first head is longer than the second head.
3. The retaining device of claim 1, wherein the first head is the same length as the second head.
4. The retaining device of claim 1, wherein the first transition is a circular bend effecting a spring force on the first body directed away from the first planar face.
5. The retaining device of claim 1, wherein the first planar face is circular, the second planar face is circular, and the platform body is cylindrical.
6. The retaining device of claim 1, wherein the first planar face is rectangular, the second planar face is rectangular, and the platform body is a rectangular prism.
7. The retaining device of claim 1, wherein the strap is operatively connected to the first portion by passing the first end through a first bore proximal to the first strap end, through a second bore between the first strap end and the second strap end, through a third bore between the first strap end and the second strap end, and through a fourth bore proximal to the second strap end.
8. The retaining device of claim 1, wherein the strap is plastic.
9. The retaining device of claim 1, wherein the strap contains an integral metal wire between the first strap face and the second strap face.
10. The retaining device of claim 1, wherein the platform is plastic.
11. The retaining device of claim 1, wherein the platform is metal.
12. The retaining device of claim 1, wherein the platform is ceramic.
13. The retaining device of claim 1, wherein the platform is a masonry composition.
14. The retaining device of claim 1, wherein the bores have a cross section which is rectangular.
15. The retaining device of claim 1, wherein the bores have a cross section which is circular.
16. The retaining device of claim 1, wherein the retaining member is of a sufficiently stiff and resilient material such that, when the first portion is not stressed, the first portion is a distance away from the second portion, at a point where the first portion and second portion are closest, of no more than 0.3175 centimeters (one-eighth of an inch).
17. The retaining device of claim 1, wherein a first bore of the strap is passed onto the first portion of the retaining device, the strap is placed over the object at least once, and the strap is operatively connected to a second retaining device.
18. The retaining device of claim 1, wherein:
   a. the platform body is cylindrical, the first planar face is circular, and the second planar face is circular;
   b. the platform is plastic;
   c. the strap is plastic and has an integral metal wire within the strap between the first strap face and the second strap face;
   d. the strap having a first planar face with a width W, and the bores having a width B which is a value between one-fourth W and three-fourths W;
   e. the retaining member is metal;
   f. the first transition aligns the first body at an obtuse angle to the first head;
   g. the second transition is U-shaped;
   h. the second end is aligned substantially normal to the first planar face;
   i. the strap is operatively connected to the first portion by passing the first end through a first bore, placing the strap over the object at least once, passing the first end through a second bore, depressing the first end toward the first planar face such that the first end can be passed into a retaining space defined by the U-shaped second transition, and releasing the first body so that the first end is retained non-permanently in the retaining space; and
   j. the retaining member is of a sufficiently stiff, elastic, and resilient material such that, when the first portion is not stressed, the first portion is a distance away from the second portion, at a point where the first portion and second portion are closest, of no more than 0.3175 centimeters (one-eighth of an inch).
19. A retaining device assembly kit or parts comprising in combination:
   a. a plurality of platforms and embedded retaining members as described in claim 1;
   b. a plurality of straps as described in claim 1;
   c. an adhesive as described in claim 1; and
   d. instructions for the user to operatively connect the strap to the retaining member for use in retaining an object to a surface.

* * * * *